United States Patent
Creguer et al.

(10) Patent No.: US 10,077,583 B2
(45) Date of Patent: Sep. 18, 2018

(54) ELECTRIC CHILD LOCKS FOR VEHICLES WITH POWER RELEASE DOOR LATCHES

(71) Applicant: GM Global Technology Operations LLC, Detroit, MI (US)

(72) Inventors: Aaron P. Creguer, Fenton, MI (US); David T. Proefke, Troy, MI (US); Ron Y. Asmar, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 15/232,929

(22) Filed: Aug. 10, 2016

(65) Prior Publication Data
US 2017/0350168 A1    Dec. 7, 2017

Related U.S. Application Data

(60) Provisional application No. 62/343,893, filed on Jun. 1, 2016.

(51) Int. Cl.
*E05B 77/26*    (2014.01)
*E05B 81/56*    (2014.01)
(Continued)

(52) U.S. Cl.
CPC ............ *E05B 77/26* (2013.01); *E05B 77/12* (2013.01); *E05B 77/54* (2013.01); *E05B 81/04* (2013.01); *E05B 81/56* (2013.01); *E05B 81/64* (2013.01); *B60R 2021/0027* (2013.01); *E05B 81/16* (2013.01)

(58) Field of Classification Search
CPC ........ E05B 77/22; E05B 77/24–77/265; E05B 77/30; E05B 81/04; E05B 81/16; E05B 81/20; E05B 81/25; E05B 81/54; E05B 81/56; E05B 81/64; E05B 81/72
See application file for complete search history.

(56) References Cited

U.S. PATENT DOCUMENTS

2006/0290143 A1* 12/2006 Watanabe ............... E05B 77/26
                                                            292/216
2009/0039658 A1*  2/2009 Spurr .................... E05B 77/26
                                                            292/336.3

FOREIGN PATENT DOCUMENTS

DE           10259972 B4      2/2005
DE         202012003171 U1    7/2013

OTHER PUBLICATIONS

First Office Action for German Application No. 10 2017 111 997.3 dated Mar. 28, 2018; 5 pages.

* cited by examiner

*Primary Examiner* — Spencer D Patton

(57) ABSTRACT

A vehicle door lock system includes an interior door handle for a rear door. A door release switch is mechanically connected to the interior door handle. A child door lock switch for the rear door is accessible by a driver. A power release door latch for the rear door is electrically connected to the door release switch and mechanically connected to the interior door handle. A mechanical child door lock switch is located on the rear door and that is mechanically connected to the power release door latch. A control module communicates with the child door lock switch, the power release door latch and the door release switch. The control module is configured to electrically actuate the power release door latch when the mechanical child door lock switch is in a locked position, the child door lock switch has an unlocked state and the door release switch is in an active state.

20 Claims, 4 Drawing Sheets

(51) Int. Cl.
*E05B 81/04* (2014.01)
*E05B 81/64* (2014.01)
*E05B 77/12* (2014.01)
*E05B 77/54* (2014.01)
B60R 21/00 (2006.01)
E05B 81/16 (2014.01)

ELECTRIC CHILD LOCKS FOR VEHICLES WITH POWER RELEASE DOOR LATCHES

CROSS-REFERENCE TO RELATED APPLICATIONS

This application claims the benefit of U.S. Provisional Application No. 62/343,893, filed on Jun. 1, 2016. The entire disclosure of the application referenced above is incorporated herein by reference.

FIELD

The present disclosure relates to vehicle door lock systems, and more particularly to vehicle door lock systems including electric child locks and power release door latches.

INTRODUCTION

The introduction provided here is for the purpose of generally presenting the context of the disclosure. Work of the presently named inventors, to the extent it is described in this introduction section as well as other aspects of the description are neither expressly nor impliedly admitted as prior art against the present disclosure. Vehicles may include child door locks to prevent a child or other person in a rear seat of a vehicle from opening one or both rear doors. When the child lock is in the locked position, the child or other person in the rear seat is unable to open the rear door using a rear interior door handle even if the doors are in an unlocked state. However, an exterior handle may still be used to open the rear door.

SUMMARY

A vehicle door lock system includes an interior door handle for a rear door. A door release switch is mechanically connected to the interior door handle. A child door lock switch for the rear door is accessible by a driver of the vehicle. A power release door latch for the rear door is electrically connected to the door release switch and mechanically connected to the interior door handle. A mechanical child door lock switch is located on the rear door and is mechanically connected to the power release door latch. A control module communicates with the child door lock switch, the power release door latch and the door release switch. The control module is configured to electrically actuate the power release door latch when the mechanical child door lock switch is in a locked position, the child door lock switch has an unlocked state and the door release switch is in an active state.

In other features, the control module is configured to not actuate the power release door latch when the mechanical child door lock switch is in the locked position, the child door lock switch is in a locked state and the door release switch is in the active state.

In other features, when the mechanical child door lock switch is in an unlocked position, the child door lock switch is in a locked state, and the door release switch is in the active state, the interior door handle mechanically releases the power release door latch. When the mechanical child door lock switch is in the unlocked position, the child door lock switch is in an unlocked state, and the door release switch is in the active state, the control module actuates the power release door latch.

In other features, the child door lock switch is arranged on a driver side door. The child door lock switch includes at least one of an icon, text or graphics that is selectable using a touchscreen display. The child door lock switch is accessible using a display associated with an instrument panel of the vehicle. The child door lock switch further controls a locked or unlocked state of a rear window of the vehicle.

In other features, the control module selectively electrically actuates the power release door latch further based on a speed of the vehicle. The control module selectively electrically actuates the power release door latch further based on a crash state of the vehicle. The control module selectively electrically actuates the power release door latch further based a diagnostic state of at least one of the child door lock switch, the power released door latch or the door release switch.

In other features, a second interior door handle operates a second rear door. A second door release switch is mechanically connected to the second interior door handle. A second child door lock switch for the second rear door is accessible by a driver of the vehicle. A second power release door latch for the second rear door is electrically connected to the second door release switch and mechanically connected to the second interior door handle. A second mechanical child door lock switch is located on the second rear door and is mechanically connected to the second power release door latch. The control module is configured to electrically actuate the second power release door latch when the second mechanical child door lock switch is in a locked position, the second child door lock switch has an unlocked state and the second door release switch is in an active state.

In other features, the control module is configured to not actuate the second power release door latch when the second mechanical child door lock switch is in the locked position, the second child door lock switch is in a locked state and the second door release switch is in the active state. When the second mechanical child door lock switch is in an unlocked position, the second child door lock switch is in a locked state, and the second door release switch is in the active state, the second interior door handle mechanically releases the second power release door latch. When the second mechanical child door lock switch is in the unlocked position, the second child door lock switch is in an unlocked state, and the second door release switch is in the active state, the control module actuates the second power release door latch.

In other features, a display displays a state of the child lock switch. The child door lock switch is arranged on a front center console of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
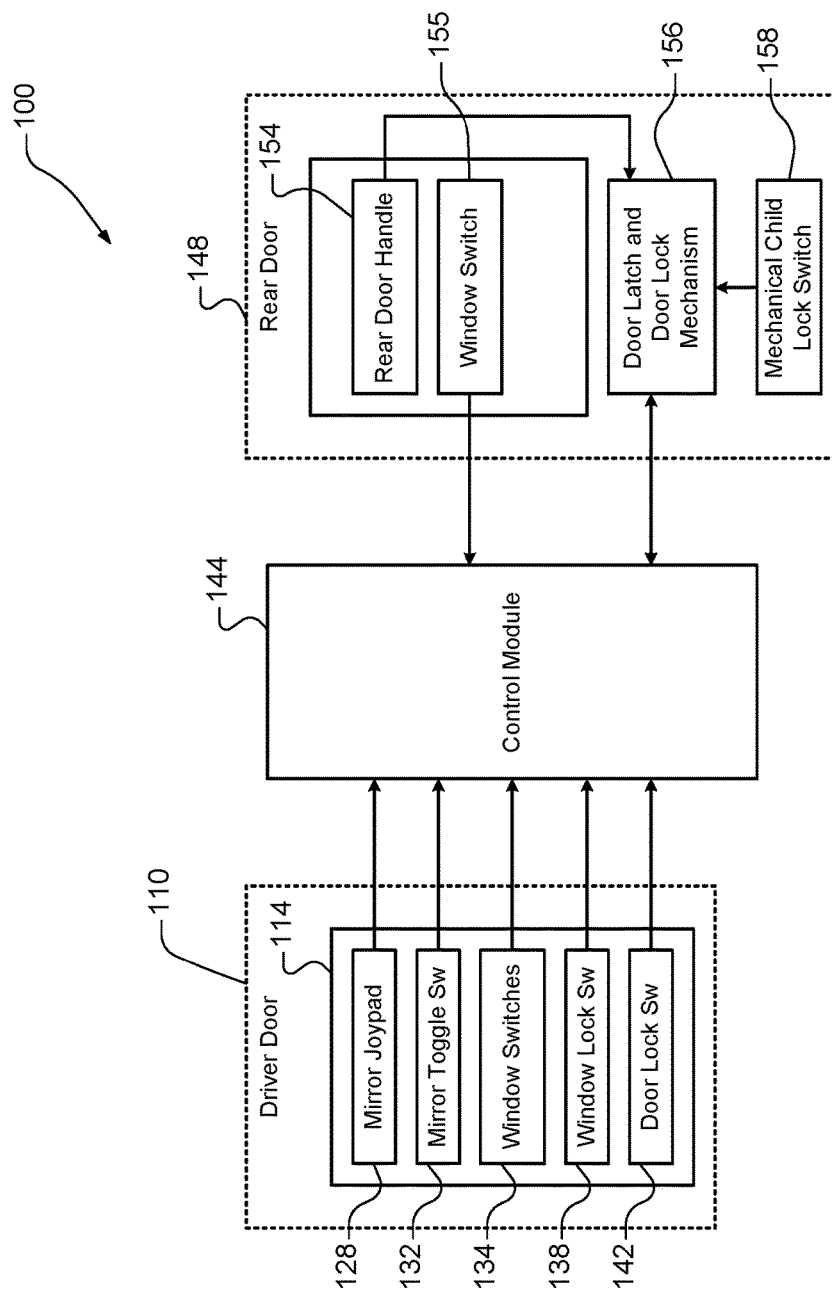
FIG. 1 is a functional block diagram of a vehicle including a vehicle door lock system.

Referring now to FIG. 1, a vehicle door lock system 100 is shown. A vehicle includes a driver side door 110 with one or more controls or switches 114 for adjusting side view mirrors and controlling windows, door locks, etc. For example, the controls or switches 114 may include a mirror joypad 128, a mirror toggle switch 132, window switches 134, a window lock switch 138 and/or a door lock switch 142. The mirror toggle switch 132 is used to select either a passenger or a driver side mirror. The mirror joypad 128 moves the mirror selected by the mirror toggle switch 132. The window switches 134 are used to individually control front or rear windows. The window lock switch 138 can be used to lock or unlock rear window switches to enable or disable control using window switches associated with rear doors. The door lock switch 142 locks and unlocks all of the vehicle doors (ability to egress still subject to positions of mechanical child lock switches if applicable). Outputs of the controls or switches 114 may be input to a control module 144 that is configured to control operation of the respective devices.

A rear door 148 may likewise include an interior rear door handle 154 and a window switch 155. The interior rear door handle 154 is mechanically coupled to a door latch mechanism 156. A mechanical child lock switch 158 (i.e., mechanical door lock, mechanical child door lock, mechanical child lock) may be arranged on an inner rear door frame surface and is usually accessible only when the rear door 148 is open. The mechanical child lock switch 158 is mechanically coupled to the door latch mechanism 156.

To prevent a child or other person in the rear seat from opening one or both of the rear doors 148, a user opens the corresponding door and moves the mechanical child lock switch 158 into a locked position. When the mechanical child lock switch 158 is in the locked position, the child or other person in the rear seat is unable to open the rear door using the rear door handle 154 even if the doors are in an unlocked state. To open the rear door 148, someone needs to open the rear door 148 using an exterior door handle (not shown). When the mechanical child lock switch 158 is in the unlocked state, the rear door 148 operates in a conventional manner.

A vehicle door lock system according to the present disclosure provides improved child door lock functionality. While the present disclosure describes a vehicle door lock system with respect to children, the vehicle door lock system can be used for controlling egress for any rear passenger. The vehicle door lock system according to the present disclosure includes an interior rear door handle that changes a state of a rear door release switch. The rear door release switch generates an active signal and a control module triggers the power release door latch. A mechanical child lock switch is provided for each rear door. The interior rear door handle is also able to mechanically release the power release door latch when the mechanical child lock switch is in an unlocked position. A child door lock switch for both doors (or one for each door) is accessible by a driver when the driver is in the driver seat and can be used to selectively override a locked position or positions of the mechanical child lock switch or switches.

Referring now to the table below, various states of the mechanical child lock switch, child door lock switch and door release switch are shown. The control module is configured to selectively electrically actuate the power release door latch when the mechanical child door lock switch is in a locked position, the child door lock switch has an unlocked state and the door release switch is in the active state. The control module is configured to not actuate the power release door latch when the mechanical child door lock switch is in a locked position, the child door lock switch is in a locked state and the door release switch is in the active state.

| Mechanical Child Lock Switch | Child Door Lock Switch | Door Release Switch | Type of Release |
| --- | --- | --- | --- |
| Locked | Unlocked | Active | Power Release |
| Locked | Locked | Active | No Power Release |
| Unlocked | Unlocked | Active | Power Release |
| Unlocked | Locked | Active | Mechanical Release |

When the mechanical child door lock switch is in an unlocked position, the child door lock switch has a locked state, and the door release switch has an active state, the control module does not electronically trigger the power release door latch. However, the interior door handle mechanically opens the rear door (independent of control from the control module). When the mechanical child door lock switch is in an unlocked position, the child door lock switch has an unlocked state, and the door release switch is in the active state, the control module electrically actuates the power release door latch.

Figure 2:
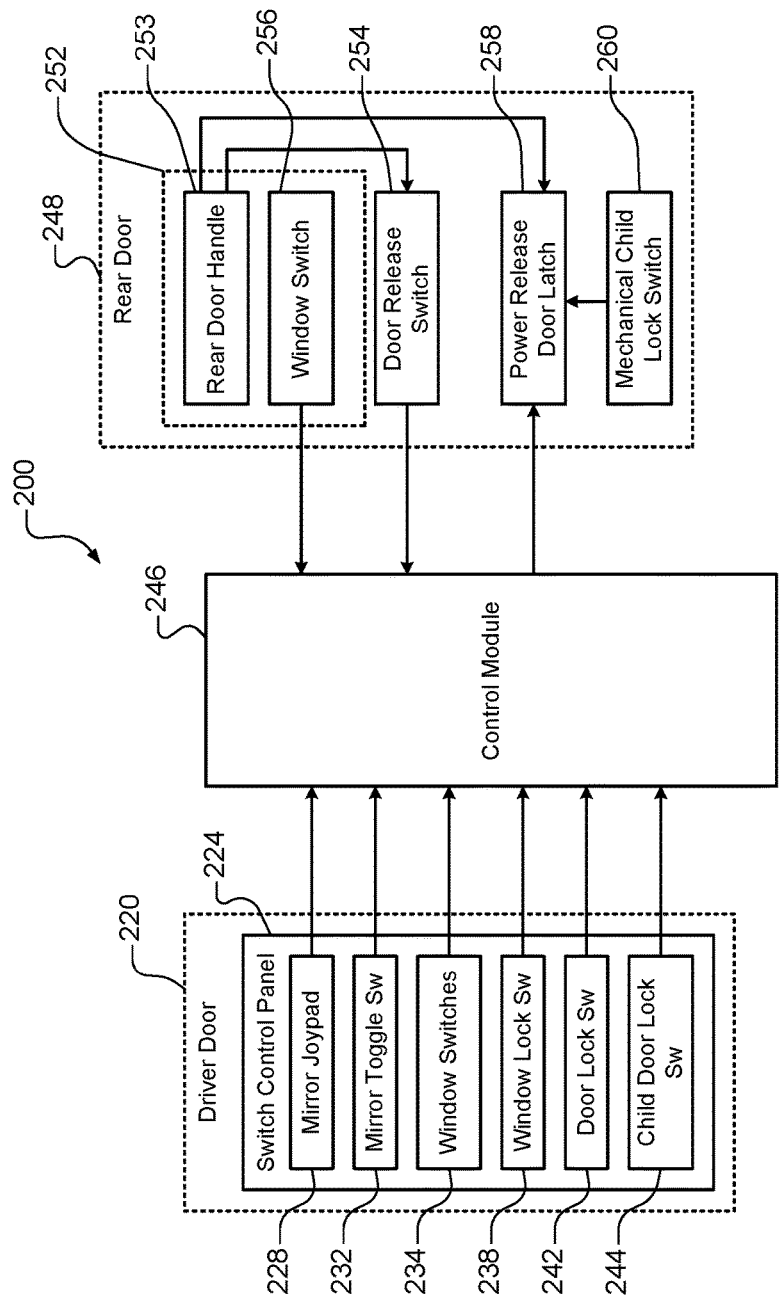
FIG. 2 is a functional block diagram of a vehicle including an example of a vehicle door lock system according to the present disclosure.

Referring now to FIG. 2, a vehicle door lock system 200 is shown. The vehicle includes a driver side door 220 with a control panel 224 including one or more controls or switches for controlling various devices. For example, the controls or switches may include a mirror joypad 228, a mirror toggle switch 232, window switches 234, a window lock switch 238 and a door lock switch 242 that operate as described above.

In addition, the controls or switches may further include a child door lock switch 244 to select a child door locked state or a child door unlocked state in a control module. In some examples, the child door lock switch 244 may simply toggle between the child door locked and unlocked states. Alternately, child door lock switch 244 may be a two state switch that remains in either the locked or unlocked state.

In some examples, the child door lock switch 244 may include a light emitting diode (LED) or other indicator that is illuminated to indicate the state of the child door lock switch 244. A text display, telltale, graphic or other icon can be output to a vehicle instrument panel or other display to indicate the logical child door locked state of the control module. In some examples, the child door lock switch 244 may require a user to trigger the child door lock switch 244 multiple times within a predetermined period or to hold the child door lock switch 244 for a predetermined period before a change in state occurs. Alternately, the window lock switch 238 can be used to lock both the rear windows and set the child lock or unlock states of the rear doors.

Outputs of the controls and switches may be input to a control module 246 that controls operation of the respective devices. A rear door 248 includes controls 252 including a rear door handle 253 and a window switch 256. The rear door handle 253 mechanically changes a state of a rear door latch release switch 254. The control module 246 monitors the state of the rear door latch release switch 254. A mechanical child lock switch 260 is mechanically linked to the power release door latch 258 and has locked and unlocked positions. The rear door handle 253 may also mechanically actuate the power release door latch 258 when the mechanical child lock switch 260 is in an unlocked position. The control module 256 determines whether or not to electronically actuate the power release door latch 258 based on the current logical child door locked state and the door release switch 254.

When the mechanical child lock switch 260 is in an unlocked state and the logical child door locked state is locked, the rear door handle 253 mechanically opens the rear door 248 without the control module electrically unlatching the rear door. When the mechanical child lock switch 260 is in an unlocked state, the door release switch 254 is active, and the logical child door locked state is unlocked, the control module power releases the rear door 248 assuming other criteria described below are met.

When the mechanical child lock switch 260 is in a locked state, the logical child door locked state is unlocked, and the rear door handle 253 is actuated, the rear door handle 253 triggers the door release switch 254. The control module 246 senses the change in state of the door release switch 254 and the logical child door locked state is currently unlocked and outputs a signal to trigger the power release door latch 258 assuming that other criteria described below are met. The rear door handle 253 is unable to mechanically open the rear door 248 since the mechanical child lock switch 260 is in the locked position.

When the mechanical child lock switch 260 is in a locked state, the logical child door locked state is locked, and the rear door handle 253 is actuated, the rear door handle 252 triggers the door release switch 254. The control module 246 senses the change in state of the door release switch 254 and the logical child door locked state is currently locked and does not trigger the power release door latch 258. The rear door handle 252 is unable to mechanically open the rear door 248 since the mechanical child lock switch 260 is in the locked position.

Figure 3:
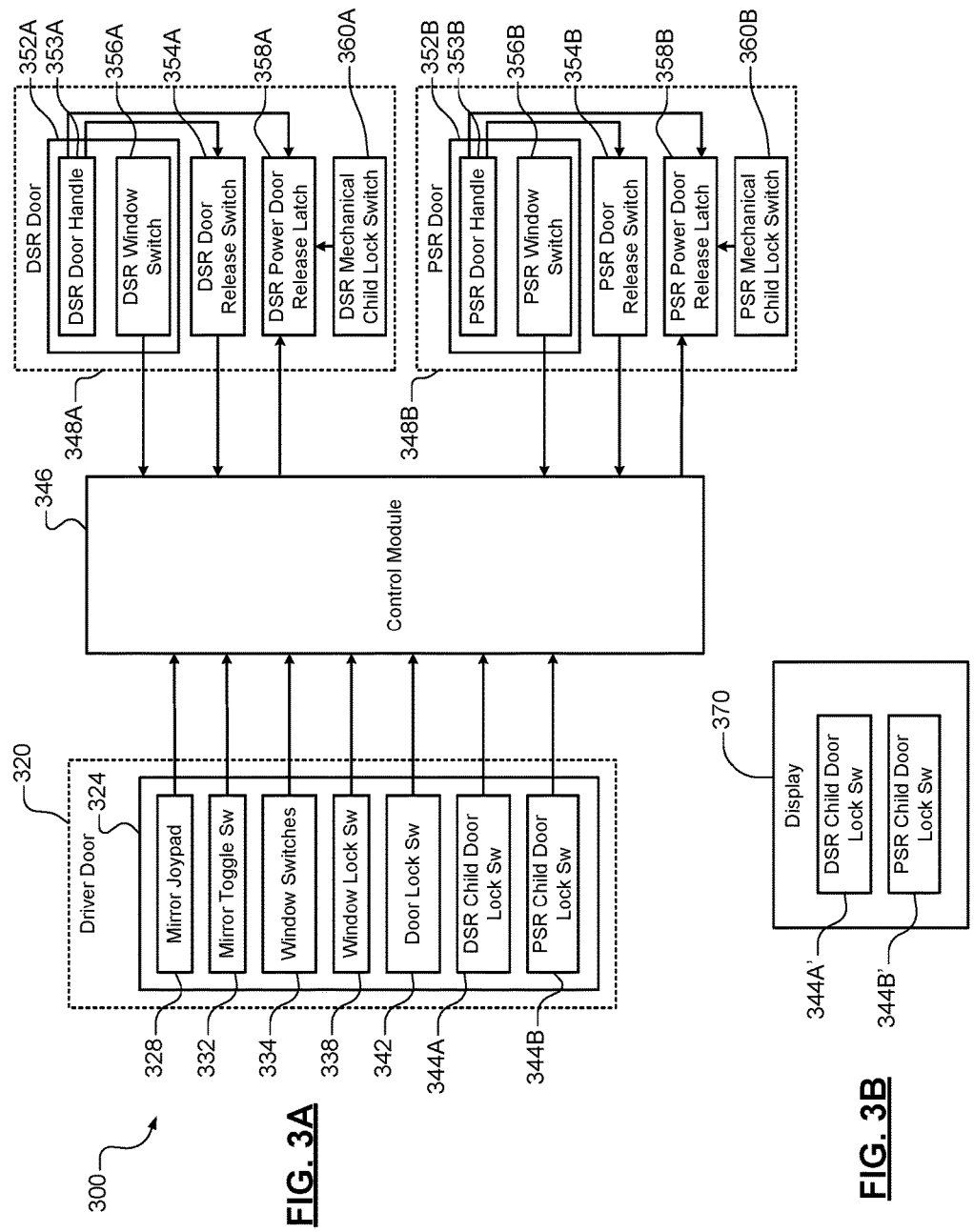
FIGS. 3A and 3B are functional block diagrams of a vehicle including another example of a vehicle door lock system according to the present disclosure.

Referring now to FIGS. 3A and 3B, a vehicle door lock system 300 for a vehicle is shown. In FIG. 3A, the vehicle includes a driver side front door 320 with controls 324 including one or more controls or switches for controlling various devices. For example, the controls or switches may include a mirror joypad 328, a mirror toggle switch 332, window switches 334, a window lock switch 338 and a door lock switch 342, that operate as described above. A driver side rear (DSR) child door lock switch 344A and a passenger side rear (PSR) child door lock switch are provided to individually control a DSR door 348A and a PSR door 348B, respectively.

Outputs of the controls and switches may be input to a control module 346 that controls operation of the respective devices. A DSR rear door 348A includes controls 352A including a DSR door handle 353A and a DSR window switch 356A. The DSR door handle 353A mechanically changes a state of a DSR door latch release switch 354A. The control module 246 monitors the DSR door latch release switch 354A and stores a state of the DSR door latch release switch 354A. A DSR mechanical child lock switch 360A is mechanically linked to the DSR power release door latch 358A and has locked and unlocked states. In addition, the DSR door handle 353A may also mechanically actuate the DSR power release door latch 358A when the DSR mechanical child lock switch 360A is in the unlocked position.

An additional set of switches may be used to independently control a passenger side rear (PSR) door in a similar manner. The control system switches may further include a passenger side rear (PSR) child door lock switch 344B to select logical child locked or unlocked states for the PSR door 348B. Outputs of the switches may be input to the control module 346 that controls operation of the respective actuators. The PSR door 348B includes a control panel 352B including a PSR door handle 352B and a PSR window switch 356B. The PSR door 348B further includes a PSR door latch switch 354B, a PSR power release door latch 358B, and a PSR mechanical child lock switch 360B.

The control module 256 determines whether or not to actuate the DSR and PSR power release door latches 358A and 358B in a manner similar to that described above in FIG. 2.

Figure 4:
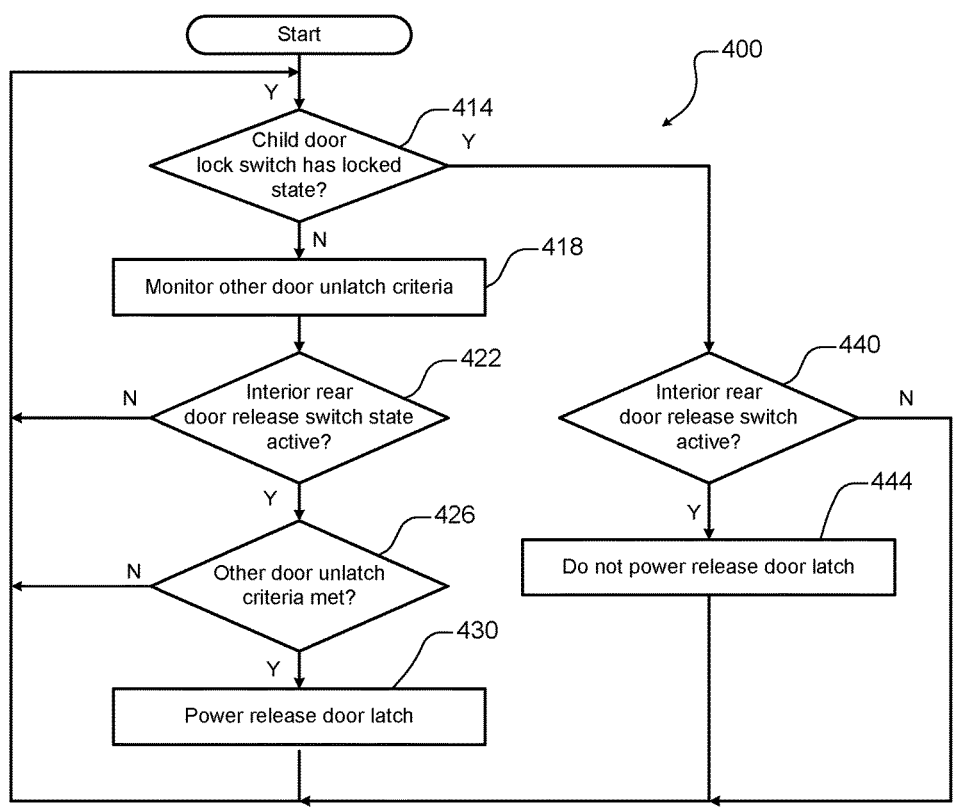
FIG. 4 is a flowchart illustrating an example of a method for operating the vehicle door lock system according to the present disclosure.

Referring now to FIG. 4, a method 400 for operating a vehicle door lock system is shown. At 414, the method determines whether the child door lock switch has a locked state. If 414 is false, the control module monitors other door unlatch criteria at 418.

In some examples, the other criteria in 418 includes whether or not the vehicle is moving at speeds less than or equal to a predetermined speed. For example, the speed may be 1-2 miles-per-hour or another speed. In some examples, the other criteria may further include whether or not the vehicle is beyond a predetermined period (such as 10 to 20 seconds) after a crash involving airbag deployment. In some examples, the other criteria may further include the absence of a diagnostic problem with the power release door latches, the child door lock switch, or door release switches (such when the switches are stuck in one state). Additional criteria may be used.

At 422, the method determines whether the interior rear door release switch has an active state. If 422 is true, the method determines whether the other door unlatch criteria is met. If 426 is true, the method power releases the door latch at 430. When 414 is true, the method continues with 440 and determines whether the interior rear door release switch is active. If 440 is true, the method does not power release the door latch at 444 and returns to 410. If 440 is false, the method returns to 410.

As can be appreciated, when a single child door lock switch is provided, both of the passenger side and driver-side rear doors are controlled in the same manner. When individual child door lock switches are provided for the driver-side and passenger side rear doors as in FIGS. 3A and 3B, then each of the doors are controlled individually.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:
1. A vehicle door lock system, comprising:
a door release switch that is mechanically connected to an interior door handle;
a child door lock switch for a rear door that is accessible by a driver of the vehicle;

a power release door latch for the rear door that is electrically connected to the door release switch and mechanically connected to the interior door handle;

a mechanical child door lock switch that is located on the rear door and that is mechanically connected to the power release door latch; and a control module that communicates with the child door lock switch, the power release door latch and the door release switch, wherein the control module is configured to electrically actuate the power release door latch when the mechanical child door lock switch is in a locked position, the child door lock switch has an unlocked state and the door release switch is in an active state.

2. The vehicle door lock system of claim 1, wherein the control module is configured to not actuate the power release door latch when the mechanical child door lock switch is in the locked position, the child door lock switch is in a locked state and the door release switch is in the active state.

3. The vehicle door lock system of claim 1, wherein:

when the mechanical child door lock switch is in an unlocked position, the child door lock switch is in a locked state, and the door release switch is in the active state, the interior door handle mechanically releases the power release door latch; and when the mechanical child door lock switch is in the unlocked position, the child door lock switch is in an unlocked state, and the door release switch is in the active state, the control module actuates the power release door latch.

4. The vehicle door lock system of claim 1, wherein the child door lock switch is arranged on a driver side door.

5. The vehicle door lock system of claim 1, further comprising a touchscreen display, wherein the child door lock switch includes at least one of an icon, text or graphics that is selectable using the touchscreen display.

6. The vehicle door lock system of claim 1, wherein the child door lock switch is accessible using a display associated with an instrument panel of the vehicle.

7. The vehicle door lock system of claim 1, wherein the child door lock switch further controls a locked or unlocked state of a rear window of the vehicle.

8. The vehicle door lock system of claim 1, wherein the control module selectively electrically actuates the power release door latch further based on a speed of the vehicle.

9. The vehicle door lock system of claim 1, wherein the control module selectively electrically actuates the power release door latch further based on a crash state of the vehicle.

10. The vehicle door lock system of claim 1, wherein the control module selectively electrically actuates the power release door latch further based a diagnostic state of at least one of the child door lock switch, the power release door latch or the door release switch.

11. The vehicle door lock system of claim 1, further comprising:

a second door release switch that is mechanically connected to a second interior door handle;

a second child door lock switch for a second rear door that is accessible by a driver of the vehicle;

a second power release door latch for the second rear door that is electrically connected to the second door release switch and mechanically connected to the second interior door handle; and a second mechanical child door lock switch that is located on the second rear door and that is mechanically connected to the second power release door latch, wherein the control module is configured to electrically actuate the second power release door latch when the second mechanical child door lock switch is in a locked position, the second child door lock switch has an unlocked state and the second door release switch is in an active state.

12. The vehicle door lock system of claim 11, wherein the control module is configured to not actuate the second power release door latch when the second mechanical child door lock switch is in the locked position, the second child door lock switch is in a locked state and the second door release switch is in the active state.

13. The vehicle door lock system of claim 11, wherein:

when the second mechanical child door lock switch is in an unlocked position, the second child door lock switch is in a locked state, and the second door release switch is in the active state, the second interior door handle mechanically releases the second power release door latch; and when the second mechanical child door lock switch is in the unlocked position, the second child door lock switch is in an unlocked state, and the second door release switch is in the active state, the control module actuates the second power release door latch.

14. The vehicle door lock system of claim 1, further comprising a display to display a state of the child door lock switch.

15. The vehicle door lock system of claim 1, wherein the child door lock switch is arranged on a front center console of the vehicle.

16. A vehicle door lock system, comprising:

at least one memory comprising computer executable instructions;

at least one processor configured to read and execute the computer executable instructions, the computer executable instructions causing the at least one processor to:

communicate with a child door lock switch for a rear door of the vehicle, a power release door latch, and a door release switch, wherein the door release switch is mechanically connected to an interior door handle, wherein the child door lock switch is accessible by a driver of the vehicle, wherein the power release door latch is for the rear door, is electrically connected to the door release switch, and is mechanically connected to the interior door handle, and wherein a mechanical child door lock switch is located on the rear door and is mechanically connected to the power release door latch; and in response to the door release switch being in an active state, control to actuate the power release door latch to release a latch of a door when the mechanical child door lock switch is in a locked position and the child door lock switch is in an unlocked state.

17. The vehicle door lock system of claim 16, wherein the computer executable instructions further cause the at least one processor to:

in response to the door release switch being in the active state, disregard the active state so that the power release door latch is inactive when the mechanical child door lock switch is in the locked position and the child door lock switch is in a locked state.

18. The vehicle door lock system of claim 17, wherein the computer executable instructions further cause the at least one processor to:

in response to the door release switch being in the active state, control to actuate the power release door latch to release the latch of the door when the mechanical child door lock switch is in an unlocked position and the child door lock switch is in the unlocked state.

19. A non-transitory computer readable medium comprising computer executable instructions, the computer executable instructions configured to cause a processor to perform a method, the method comprising:

communicating with a child door lock switch for a rear door of a vehicle, a power release door latch, and a door release switch, wherein the door release switch is mechanically connected to an interior door handle, wherein the child door lock switch is accessible by a driver of the vehicle, wherein the power release door latch is for the rear door, is electrically connected to the door release switch, and is mechanically connected to the interior door handle, and wherein a child door lock switch is located on the rear door and is mechanically connected to the power release door latch; and in response to the door release switch being in an active state, controlling to actuate the power release door latch to release a latch of a door when the child door lock switch is in a locked position and the child door lock switch is in an unlocked state.

20. The non-transitory computer readable medium of claim 19, wherein the method further comprises:

in response to the door release switch being in the active state, disregarding the active state so that the power release door latch is inactive when the mechanical child door lock switch is in the locked position and the child door lock switch is in a locked state; and in response to the door release switch being in the active state, controlling to actuate the power release door latch to release the latch of the door when the child door lock switch is in an unlocked position and the child door lock switch is in the unlocked state.

* * * * *